Jan. 26, 1932.   I. C. BELL   1,842,383
SUCTION SUPPORTING DEVICE
Filed Nov. 29, 1929

Inventor
Ivan C. Bell
By Jack A. Ashley
Attorney

Patented Jan. 26, 1932

1,842,383

UNITED STATES PATENT OFFICE

IVAN C. BELL, OF DALLAS, TEXAS

SUCTION SUPPORTING DEVICE

Application filed November 29, 1929. Serial No. 410,535.

This invention relates to new and useful improvements in suction supporting devices.

One object of the invention is to provide an improved suction supporting device of the type wherein the device is made of flexible material, such as compounded rubber, and is distorted to cause it to create a suction when reflexed upon a flat surface, whereby it is caused to adhere thereto.

A particular object of the invention is to provide a suction supporting device in the form of a flexible cup or dished member, whereby a suction dome is formed especially adapted to function because of its structural characteristics.

Still another object of the invention is to provide a suction supporting device which is circular in shape and is reduced to a sharp annular edge, together with an inner circular wall rising from the contact edge, which wall is substantially rectilinear in cross-section or radially, rather than curved, as is the usual practice.

An important object of the invention is to provide a plurality of annular valves or flexible lips circumferentially of the dome and adjacent the annular edge so as to engage with the flat surface and provide barriers resisting the entrance of air into the dome to defeat the suction.

A construction designed to carry out the invention will be hereinafter described, together with other features of the invention.

Figure 1:
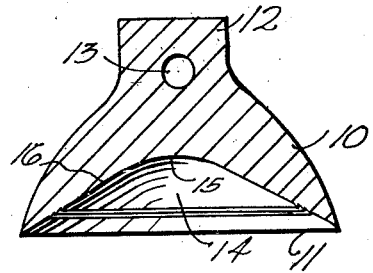
Figure 2:
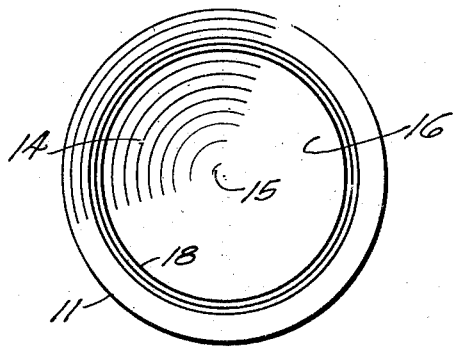
Figure 4:
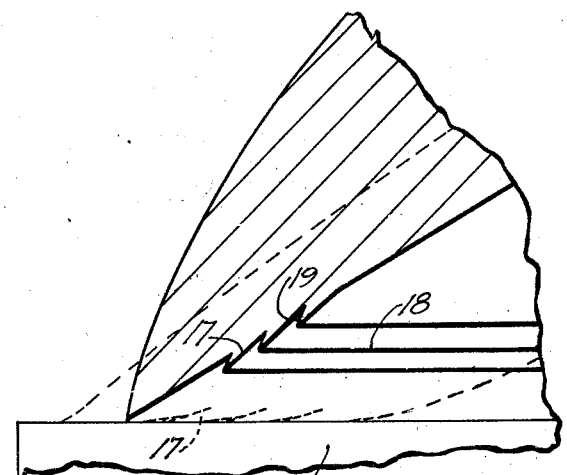
Figure 3:
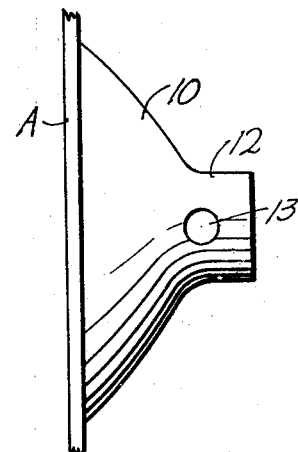
Figure 5:
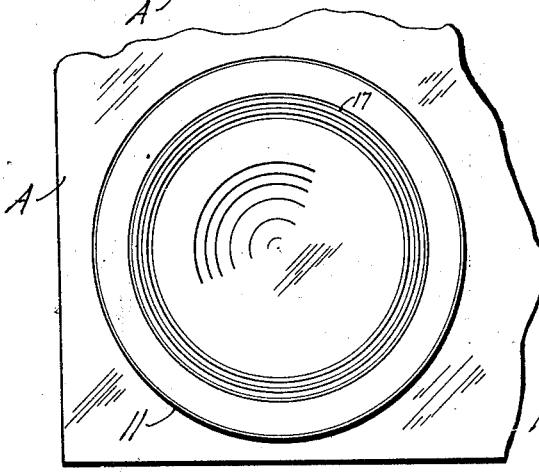

The invention will be more readily understood from a reading of the following specification and by reference to the accompanying drawings in which an example of the invention is shown, and wherein:

Figure 1 is a transverse sectional view of a device constructed in accordance with the invention, Figure 2 is a face view of the same, Figure 3 is a side elevation of the device, Figure 4 is an enlarged detail showing the device in full lines resting upon a flat surface and indicating in dotted lines its position when fastened upon said surface, and Figure 5 is an elevation looking through a transparent plate for showing the device adhering to the rear side thereof.

In the drawings the numeral 10 designates a cup-shaped supporting device which is circular in shape, being reduced to a comparatively sharp circular edge 11 and having a central boss or shank 12. The shank 12 may be provided with an aperture 13 for attaching an article thereto. It is to be understood that the particular shape of the outer side of the device is not essential to the invention and the boss 12 merely used as an illustration, because the cup may be correlated with any other element suitable for the purpose.

It is preferable to make the cup of compounded rubber, but any flexible medium suitable for the purpose may be used. The cup is provided in its face with a concaved dome or cavity 14, the walls of which are curved circumferentially in harmony with the edge 11. However, it is important that only the central portion 15 of the dome be curved and the wall 16 extending radially or transversely from this curved portion is rectilinear and while inclined downward at the said edge, is substantially free from transverse curvature. This is the preferred form but the invention is not to be limited to this rectilinear wall.

By reason of the rectilineaer wall, it is obvious that when the cup is depressed so as to spread its edge 11 the wall 16 will tend to lie flat upon the surface A rather than arch the same. This is particularly efficient for use with a plurality of annular lips or ribs 17 depending from the wall 16, spaced slightly above the edge 11, but preferably concentric thereto. Each lip 17 is reduced to substantially a knife edge 18 and its upper side 19 is cut back so as to reduce the edge 18 and make the latter extremely flexible, as is best shown in Figure 4.

It will be seen that when the cup is depressed the edges 11 and 18 will contact with the surface A and the lips 17 will spread on said surface, thus forming valves so that air leaking under the edge 11 must also leak under the three edges 18 in order to break the suction within the dome 14, as is indicated in dotted lines in Figure 4. Figure 5 gives a graphic illustration of how the valves formed by the lips 17 spread and contact with the surface of the flat support A.

Owing to the sharp edges and flexibility of the valve lips a more intimate contact is maintained because of the tendency of the lips to lie flat on the surface and drag over said surface when the cup reflexes upon being relieved of the pressure thereon. While these valve lips will operate on a curved radial wall, their operation is more efficient when the wall is rectilinear. Actual tests have shown that these valves will prolong the contact and maintain the suction for a considerable longer period than the usual suction cup.

It is also pointed out that the edge 11 is given full opportunity to seal on the surface of the flat support A before the lips contact, but it is not necessary to depress the cup to an extreme distortion before the lips 17 engage the same surface. It is further pointed out that when the cup is depressed the entire wall 16 from the edge of the outermost lip 17 to the outer edge 11 is in contact with the flat surface of the support A and the lips lie flat upon said surface, thus forming an efficient seal.

Various changes in the size and shape of the different parts, as well as modifications and alterations, may be made within the scope of the appended claims.

What I claim is:

1. A suction supporting device comprising a member having a suction dome and an outer contact edge, the inner wall of the dome extending to said edge, and an annular valve lip attached to said dome wall and reduced to a sharp edge terminating above the dome edge and being so flexible as to lie against said dome wall when the dome is depressed.

2. A suction supporting device comprising a member having a dome and an outer contact edge, the inner wall of said dome extending from said edge being rectilinear radially of said dome, and a plurality of concentric flexible lips depending from said rectilinear wall and spaced from the edge, whereby the lips and the wall between them and the edge lie substantially flat when the member is depressed upon a flat surface.

In testimony whereof I affix my signature.

IVAN C. BELL.